Nov. 10, 1936.    L. KENEDY    2,060,624
BOOKMARK
Filed Oct. 3, 1934
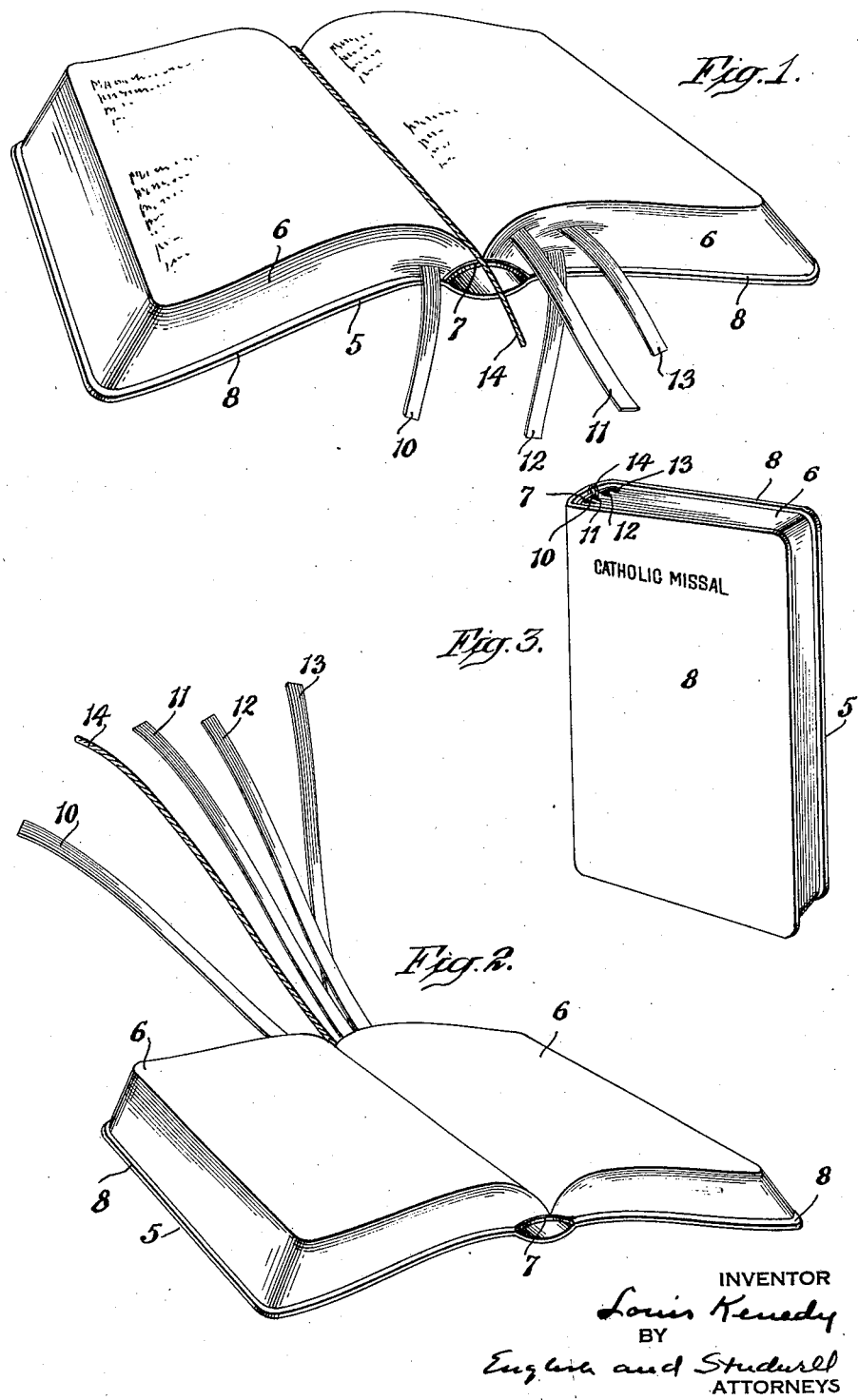
INVENTOR
Louis Kenedy
BY
English and Studwell
ATTORNEYS Patented Nov. 10, 1936

2,060,624

UNITED STATES PATENT OFFICE 2,060,624

BOOKMARK

Louis Kenedy, New Rochelle, N. Y., assignor to P. J. Kenedy & Sons, New York, N. Y., a corporation of New York Application October 3, 1934, Serial No. 746,648

1 Claim. (Cl. 281—42)

This invention relates to book marks and has for its object to provide a simple means by which a selected position in a book can be indicated and readily found. The invention has particular reference to prayer books, educational works and reference books. It is also of great advantage in books where maps or charts are part of the text and are periodically referred to during the reading of various portions of the book.

In cases of prayer books and other religious works, the reader often uses a basic selection in the book, interpolating therein portions of other reading matter found at other different points in the book. He usually marks the various points in the book by several conventional markers so that he may expeditiously turn from one position in the book to the next, then returning to the first position, thence to a third position, returning again to the first position, and this continues as speedily as possible, although often with some interruption in the continuity of the reading. This is, of course, somewhat objectionable when the reader is reading publicly, reciting prayers or conducting religious services or speaking at public gatherings.

The primary object of this invention is therefore, to provide a means by which the basic or important location in a book may be distinctively marked so that the book will automatically open at such marked position, despite the fact that numerous other positions in the book may also be marked, but by markers of a different character.

More specifically, the invention contemplates the provision of a marker of a flexible nature, and of a relatively substantial thickness, so that when the book is permitted to open of its own accord, it will automatically fall open at the point where the marker is located. When such a marker is used in combination with several other markers of different cross-sectional shape, such as flat, flexible tapes, the reader can indicate the point wherein the basic text is located, by the thicker marker, can speedily turn therefrom to any of the points indicated by the other markers, and can at once return to the basic text by closing the book slightly and then permitting it to fall open.

In the accompanying drawing Fig. 1 is a perspective view of a book with the improved marker in position; Fig. 2 is a similar view showing the marker and several additional tape-like markers protruding from the book; and Fig. 3 is a perspective view of the book in closed position.

In the drawing, 5 indicates a book which may be of conventional construction and which has its numerous pages 6 permanently attached to the binding element 7 of the back and encased between the covers 8, this style of binding being commonly known in the trade as a full bound book, as distinguished from loose leaf bindings such as books bound with rings, spiral fasteners, and metallic spring backs. A number of markers of conventional character are shown at 10, 11, 12 and 13, these markers consisting of sections of flat, flexible, fabric tapes which are adhesively secured at one of their ends in the binding 7 of the book, and protrude freely therefrom so that they may be folded over and placed between pages of the book at any selected points. These tape-like markers 10, 11, 12 and 13 may each be of a different color to distinguish them from one another.

At 14 is indicated a marker, which preferably consists of a cord-like flexible element of greater thickness or cross-sectional shape than the markers shown at 10, 11, 12 and 13. The marker 14 has one of its ends adhesively secured in the binding 7 of the book and protrudes freely therefrom so that it may be inserted at any point between the pages of the book. When the marker 14 is in position between the pages, it will be seen that by reason of its greater cross-sectional diameter than the other markers, it will readily tend to cause the book to automatically open at the point between its pages where marker 14 is located when the book is held loosely in the hand or is resting on a surface with the free edges of the book pointing upwardly. In other words, when the book is closed and permitted to fall open, it will at once automatically open at the point where the thicker marker 14 is located rather than at any of the other points where the flat tape-like markers 10 to 13 inclusive are placed.

The advantages of this arrangement are apparent. For example, when a prayer book is being used, the marker 14 is inserted at the point in the book where the basic portion of the prayer is printed and the other markers are inserted at points in the book where interpolated portions of the prayer are found. Thus, the reader, engaged in reading the basic portion of the prayer, can readily turn to the various other points in the book as required, and can instantly revert to the point where the marker 14 is located by merely permitting the book to fall open.

While I have shown the marker 14, of a relatively large cross-sectional shape, used in combination with a plurality of other markers such as a number of flat tapes, it will be understood that the marker 14 may be used alone or in combination with other cord-like markers of lesser diameter than the main marker. The device is adapted for use in connection with prayer books as herein described, although it may be used in connection with numerous other volumes without departing from the spirit of the invention.

What I claim is:

A full bound book including a plurality of leaves permanently attached along one edge to the binding element of the back of the book permitting the unattached edges of the leaves to be moved away from and toward each other in opening and closing the book, and a plurality of flat flexible tapes secured to the binding element and freely projecting therefrom for removable insertion at selected places between the leaves of the book, a cord secured to the binding element and adapted for insertion between any two leaves of the book, said cord being of such thickness that when placed between leaves and relatively close to the binding element and the book is held loosely in the hand or resting on the binding element with the unattached edges of the leaves pointing upwardly, the book will automatically open at the point at which the cord is inserted.

LOUIS KENEDY.